US006197390B1

(12) United States Patent
LaVite

(10) Patent No.: US 6,197,390 B1
(45) Date of Patent: Mar. 6, 2001

(54) MULTI-PURPOSE VEHICLE ORNAMENT

(76) Inventor: Brian M. LaVite, 1222 Olivette, Collinsville, IL (US) 62234

(*) Notice: Subject to any disclaimer, the term of this patent is extended or adjusted under 35 U.S.C. 154(b) by 0 days.

(21) Appl. No.: 09/524,210

(22) Filed: Mar. 10, 2000

(51) Int. Cl.[7] ................................. B60R 13/00
(52) U.S. Cl. ......................... 428/31; 428/7; 428/11; 428/542.2; 428/542.8; 428/905; 343/720; 40/591; 40/593
(58) Field of Search ................. 428/31, 11, 905, 428/15, 542.2, 542.8; 40/591, 593; 343/720

(56) References Cited

U.S. PATENT DOCUMENTS

| 3,320,920 | 5/1967 | Lusebrink . | |
|---|---|---|---|
| 3,363,600 | 1/1968 | Gary . | |
| 3,531,634 | 9/1970 | Plouch . | |
| 4,352,461 | 10/1982 | Orta et al. | 239/211 |
| 4,526,820 | 7/1985 | Haas | 428/31 |
| 5,636,588 | 6/1997 | Keller et al. | 116/209 |
| 5,836,261 | * 11/1998 | Sutton | 116/209 |

* cited by examiner

Primary Examiner—Deborah Jones
Assistant Examiner—Abraham Bahta
(74) Attorney, Agent, or Firm—Kenneth L. Tola

(57) ABSTRACT

A multi-purpose vehicle ornament includes a hollow base component configured to resemble a select figurine, such as an animal's head, having one or more apertures thereon in communication with an interior chamber. The base component includes a neck portion adapted to receive a trailer hitch ball, an air freshener assembly or an attachment plug that is mountable to the top end of a vehicle antenna. The attachment plug includes a warning device that alerts nearby animals of an approaching vehicle.

10 Claims, 2 Drawing Sheets

MULTI-PURPOSE VEHICLE ORNAMENT

BACKGROUND OF THE INVENTION

The present invention relates to a decorative ornament attachable to a vehicle's antenna, trailer hitch or rearview mirror that interchangeably functions as an air freshener or warning device.

DESCRIPTION OF THE PRIOR ART

Animal lovers typically display animal related messages and artwork on bumper stickers, license tags and other conspicuous areas on or within a vehicle. Furthermore, such animal lovers are often concerned with striking animals that may enter the roadway. The present invention provides a vehicle ornament that may be interchangeably used as an antenna cover, a trailer hitch cover or an interior ornament. Furthermore, the device is uniquely configured to function as either an air freshener when displayed within the vehicle passenger compartment or a warning device when attached to the antenna to alert nearby animals of an approaching vehicle.

Various ornamental attachments for vehicles exist in the prior art. For example, U.S. Pat. No. 5,636,588 issued to Keller et al relates to an identification device for mounting on the antenna of a vehicle that enables an owner or operator to identify the vehicle.

U.S. Pat. No. 4,526,820 issued to Haas relates to an ornamental marker for vehicle antennas including a pair of engageable marker members each having a longitudinal channel to encompass the antenna. The outer surfaces of the marker members are provided with identifiable indicia either printed or integrally formed thereon.

U.S. Pat. No. 4,352,461 issued to Orta et al relates to an air freshener device mountable inside a vehicle including a hand shaped container oscillated on a flexible rod. The rod is attached to the vehicle dashboard with a suction cup.

U.S. Pat. No. 3,531,634 issued to Plouch relates to figurine mount for a vehicle including an illumination device.

U.S. Pat. No. 3,363,600 issued to Gary relates to a signal device for a vehicle including a holster and a wire frame removably mounted in one of a number of positions in the holster.

U.S. Pat. No. 3,320,920 issued to Lusebrink relates to a light reflecting mounted spotting signal.

Although various antenna attachments exist in the prior art, most are designed to assist a user in spotting a vehicle. The present invention relates to a vehicle that interchangeably functions as a warning device or an air freshener. Furthermore, the device is attachable to a trailer hitch ball, a vehicle antenna or a rear view mirror.

SUMMARY OF THE INVENTION

The present invention relates to multipurpose vehicle ornament. The device comprises a hollow base component having an interior chamber and an exterior surface molded to resemble a select figurine such as an animal head. The base component includes one or more apertures selectively positioned on the exterior surface thereof which are in communication with the interior chamber. A hook is mounted on the top portion of the base component for securing the device to a support member. The base component also includes a lower neck portion dimensioned to interchangeably receive either a trailer hitch ball or an attachment plug. The attachment plug includes a receptacle having a similar configuration as the top end of a vehicle antenna allowing the antenna to be easily inserted therein. An air freshening device may be installed within the base component instead of the plug for delivering fresh air to the atmosphere via the apertures. It is therefore an object of the present invention to provide a vehicle ornament that simultaneously functions as a warning device.

It is another object of the present invention to provide a vehicle ornament that can be interchangeably attached to an antenna or trailer hitch.

It is yet another object of the present invention to provide a vehicle ornament that can function as an air freshener for a vehicle passenger compartment. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
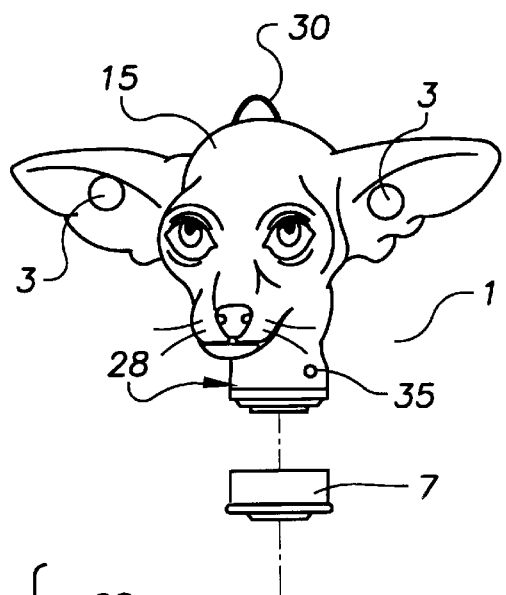
FIG. 1 is a front slightly exploded view of the present invention.
Figure 2:
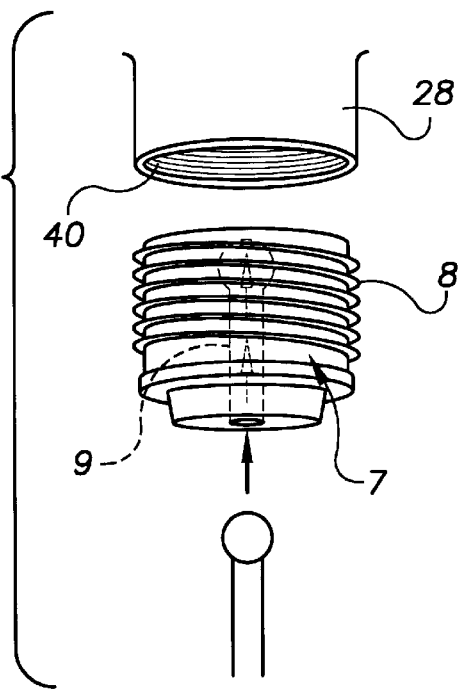
FIG. 2 is a detailed view of the attachment plug.

Referring now to FIGS. 1 through 5, the present invention relates to a multi-purpose ornament for a vehicle. The device comprises a hollow base component 1 having an exterior surface and an interior chamber. The exterior surface of the base component is molded or configured to resemble a select figurine such as a pet's head 15. Selectively positioned on the exterior surface of the base component are one or more apertures 3 in communication with the interior chamber. For example, the apertures may each be positioned within one of the animal's ears or in any other convenient location.

The top end of the base component includes a hook 30 for fastening the device to a support member such as a vehicle rear view mirror. The base component further includes a neck 28 depending therefrom, the neck having an opening in communication with a hollow portion dimensioned to interchangeably receive the ball 5 of a trailer hitch or an attachment plug 7.

Figure 3:
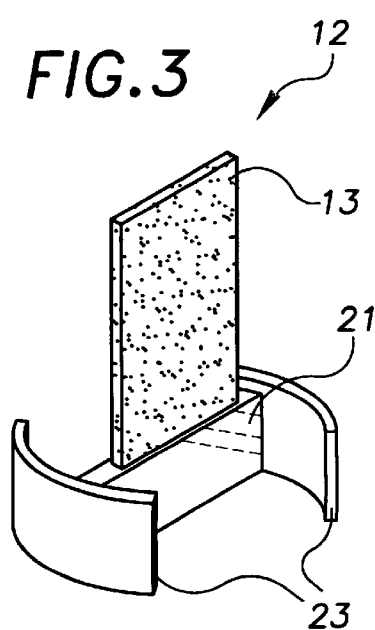
FIG. 3 is a detailed perspective view of the air freshener.
Figure 5:
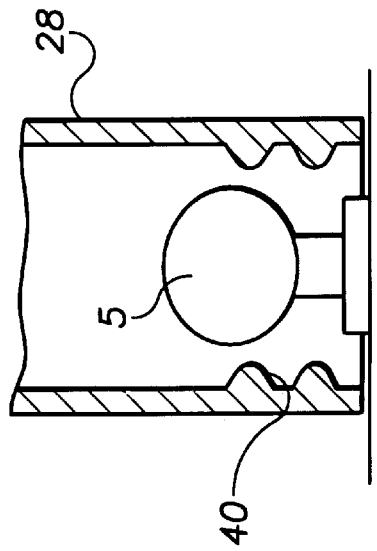
FIG. 5 is a cross-sectional view of the device attached to a vehicle trailer hitch ball.
Figure 4:
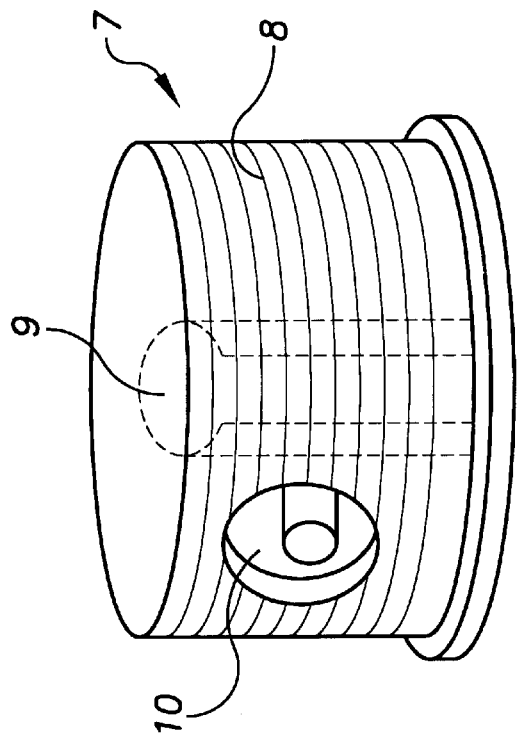
FIG. 4 is a detailed view of the attachment plug and integral warning device.

The attachment plug 7 is used to mount the device to a vehicle antenna. The plug includes an externally threaded portion 8 for threadedly engaging an internally threaded portion 40 within the hollow portion of the neck. The plug further includes a receptacle 9 having a similar configuration as the top end of a vehicle antenna to conveniently secure the plug thereto. As depicted in FIG. 3, the plug member further includes a "wind tunnel" type passageway 10 thereon that aligns with an aperture 35 on the neck allowing air to pass through the passageway when the vehicle is moving. As air rapidly moves through the passageway, a high frequency signal is emitted. The high frequency signal will not be detectable by the human ear and will only be heard by animals in the vicinity to warn the animals of an approaching vehicle.

The device further includes an air freshener means 12 which may be inserted into the neck of the base component in place of the attachment plug. The air freshener includes a panel 13 impregnated, precoated or otherwise pretreated with a deodorizing material. The panel is mounted on an attachment clip that includes a transverse member 21 with a pair of resilient but slightly flexible arcuate flanges 23 that tightly engage the inner surface of the neck when the air freshener is inserted therein. Accordingly, the base component may be suspended within the interior of a vehicle with the air freshener received therein thereby providing an ornamental deodorizing means.

The base component and attachment plug are preferably constructed with a rigid but slightly flexible material such as rubber allowing the device to be deformed slightly if necessary. However, as will be readily apparent to those skilled in the art, size, shape and materials of construction may be varied without departing from the spirit of the present invention. Furthermore, although the head of a specific dog breed is shown and described, the device may be formed to resemble any breed of animal, a human or miscellaneous inanimate objects.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A multi-purpose vehicle ornament comprising:

a hollow ornamental base component, said base component having an interior chamber and a neck, said neck having an opening in communication with the interior chamber, said chamber dimensioned to receive a trailer hitch ball;

an attachment plug adapted to be attached to a vehicle antenna, said plug further adapted to be coupled with said base component neck allowing said base component to be conveniently attached to said vehicle antenna, said attachment plug including a wind tunnel passageway aligned with a hole on said neck when said base component is coupled with said plug for emitting a high frequency signal as said vehicle is moving to alert nearby animals.

2. The multi-purpose vehicle ornament according to claim 1 wherein said base component further includes at least one aperture selectively positioned thereon, said aperture in communication with the interior chamber.

3. The multi-purpose vehicle ornament according to claim 2 comprising:

an air freshener assembly removably received within said interior chamber for emitting a deodorizing vapor through said aperture to the atmosphere;

means for securing said air freshener assembly within said interior chamber.

4. The multi-purpose vehicle ornament according to claim 3 wherein said means for securing said air freshener assembly within said interior chamber comprises:

a pair of opposing resilient but flexible flanges attached to said air freshener assembly that tightly engage an inner surface of said chamber when inserted therein.

5. The multi-purpose vehicle ornament according to claim 1 wherein said base component includes a hook for suspending said base component from a support member.

6. A multi-purpose vehicle ornament comprising:

a hollow ornamental base component, said base component having an interior chamber and a neck having an opening in communication with the interior chamber, said chamber dimensioned to receive a trailer hitch ball; said base component further including at least one aperture selectively positioned thereon, said aperture also in communication with the interior chamber;

an air freshener assembly removably received within said interior chamber for emitting a deodorizing vapor through said aperture to the atmosphere;

means for securing said air freshener assembly within said interior chamber.

7. The multi-purpose vehicle ornament according to claim 6 further comprising:

an attachment plug adapted to be attached to a vehicle antenna, said plug further adapted to be coupled with said base component neck allowing said base component to be conveniently attached to said vehicle antenna.

8. The multi-purpose vehicle ornament according to claim 7 wherein said attachment plug includes a wind tunnel passageway aligned with a hole on said neck when said base component is coupled with said plug for emitting a high frequency signal as said vehicle is moving to alert nearby animals.

9. The multi-purpose vehicle ornament according to claim 6 wherein said means for securing said air freshener assembly within said interior assembly a pair of opposing resilient but flexible flanges attached to said air freshener assembly that tightly engage an inner surface of said chamber when inserted therein.

10. The multi-purpose vehicle ornament according to claim 6 wherein said base component includes a hook for suspending said base component from a support member.

* * * * *